United States Patent [19]
Love

[11] Patent Number: 5,878,776
[45] Date of Patent: Mar. 9, 1999

[54] INSULATING JACKET

[76] Inventor: Ruth Love, 714 Hwy. 78 E., Suite 301, Jasper, Ala. 35501

[21] Appl. No.: 855,432

[22] Filed: May 13, 1997

[51] Int. Cl.⁶ .................................................... F16L 59/16
[52] U.S. Cl. ............................. 137/375; 138/149; 285/47
[58] Field of Search ........................... 137/375; 138/149; 285/47

[56] References Cited

U.S. PATENT DOCUMENTS

| | | |
|---|---|---|
| D. 290,990 | 7/1987 | Izzi . |
| 2,650,180 | 8/1953 | Walker . |
| 2,686,530 | 8/1954 | Dire . |
| 4,071,043 | 1/1978 | Carlson . |
| 4,244,394 | 1/1981 | Hartselle, III . |
| 4,556,082 | 12/1985 | Riley et al. ............................. 137/375 |
| 4,577,655 | 3/1986 | Carroll ..................................... 137/375 |

*Primary Examiner*—A. Michael Chambers
*Attorney, Agent, or Firm*—Terrance L. Siemens

[57] ABSTRACT

An insulating jacket for covering and insulating an exterior faucet against damage from exposure to cold temperatures. The insulating jacket comprises three plastic bags arranged concentrically and all opening in one direction. The innermost bag is covered on its exterior surface with adhesive, to which is adhered loose insulating fill material. The insulated innermost bag is surrounded by a fabric sock. The fabric sock is in turn surrounded by the second bag. A woolen sock surrounds the second bag. The third plastic bag surrounds the woolen sock. The open end of the resultant assembly is rolled to form a cuff. A draw cord is disposed to constrict the cuff over a faucet, pipe, or other component of the object being protected.

2 Claims, 2 Drawing Sheets

INSULATING JACKET

BACKGROUND OF THE INVENTION

1. Field of the Invention

The present invention relates to insulation jackets for protecting objects which could be damaged by exposure to freezing temperatures, such as faucets and similar components of a plumbing system. More particularly, the invention sets forth effective construction of an insulating jacket which is flexible, can constrict about the protected object, and can be fabricated from commonly available materials.

2. Description of the Prior Art

It has become common practice to protect exposed components of plumbing systems by encasing these components in insulating jackets. In most cases, the insulating jackets are temporarily installed during the cold season and are removed in the warm season. To be effective and limited to reasonable dimensions, the insulating jacket must cooperate with the object it surrounds. This characteristic is not easily achieved since while pipes include many straight runs of constant or unvarying configuration, plumbing systems include irregularly configured components such as faucets, traps, branching fittings, and the like.

The prior art has proposed insulating jackets specifically for protecting exteriorly located residential faucets. Examples are seen in U.S. Pat. No. 2,650,180, issued to Stanley F. Walker on Aug. 25, 1953, U.S. Pat. No. 2,686,530, issued to Frank Dire on Aug. 17, 1954, U.S. Pat. No. 4,071,043, issued to Cleo D. Carlson on Jan. 31, 1978, and U.S. Pat. No. 4,244,394, issued to William Hartselle, III on Jan. 13, 1981. In each of these prior art examples, the subject device includes a rigid outer housing or shell which in most cases covers a somewhat flexible or deformable layer of insulating material. The outer housing resists weather and holds the insulation closely against the protected object.

These prior art devices lack the construction of the present invention wherein plural water and wind resistant strata alternate with plural insulating strata. Flexible insulation material employed in the prior art devices is not of the type to retain effectiveness if saturated with water. Also, the prior art devices lack a flexible outer cover and the ability to constrict at the open end, as seen in the present invention.

None of the above inventions and patents, taken either singly or in combination, is seen to describe the instant invention as claimed.

SUMMARY OF THE INVENTION

The present invention provides an insulation jacket which need not conform closely to the object being protected since the novel insulation jacket is entirely flexible. The novel insulation jacket comprises strata of flexible wind and water impermeable material alternating with flexible insulation material, having an innermost member and outermost member provided by plastic bags or the like. Insulation in the form of loose fill is adhered to the exterior surface of the innermost bag, which is then surrounded by a fabric sock and a second bag. A layer of wool surrounds the second bag. A final bag encloses the wool.

The open end of the resultant insulation jacket is rolled, and a draw cord is placed in the rolled end so as to be able to constrict the open end around the object being protected. Thus, no special structure for securing the insulating jacket to the protected object is required. Also, effective length of the novel insulating jacket is adjusted without cutting or otherwise permanently modifying the same. The insulating jacket is readily installed and removed for subsequent use, and may be stored flat for compactness.

The novel construction enables fabrication without the use of dies, forms, or jigs. Construction utilizes materials and components available in their final form. The resultant insulating jacket, all members being flexible, will conform to a degree to the object being protected. This characteristic obviates necessity for construction cooperating closely with the configuration of the protected object, so that the novel insulating jacket is nearly universally compatible with exterior faucets. Concentrically disposed layers of plastic assure that even should the outermost layer succumb to wind or water, resistance to the same is not fully compromised. The wool layer will continue to have effectiveness as insulation even if saturated with water.

Accordingly, it is a principal object of the invention to provide an insulating jacket for protecting exterior faucets and other components of a plumbing system.

It is another object of the invention that the entire jacket be flexible, so as to conform to the configuration of the object being protected.

It is a further object of the invention to provide redundant strata of wind and water resistant material.

Still another object of the invention is to provide insulation which retains effectiveness even if saturated with water.

An additional object of the invention is to provide a constricting element for closing the open end of the insulating jacket over an object being protected.

It is again an object of the invention to render the novel insulation jacket adjustable as to length without permanently modifying the same.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
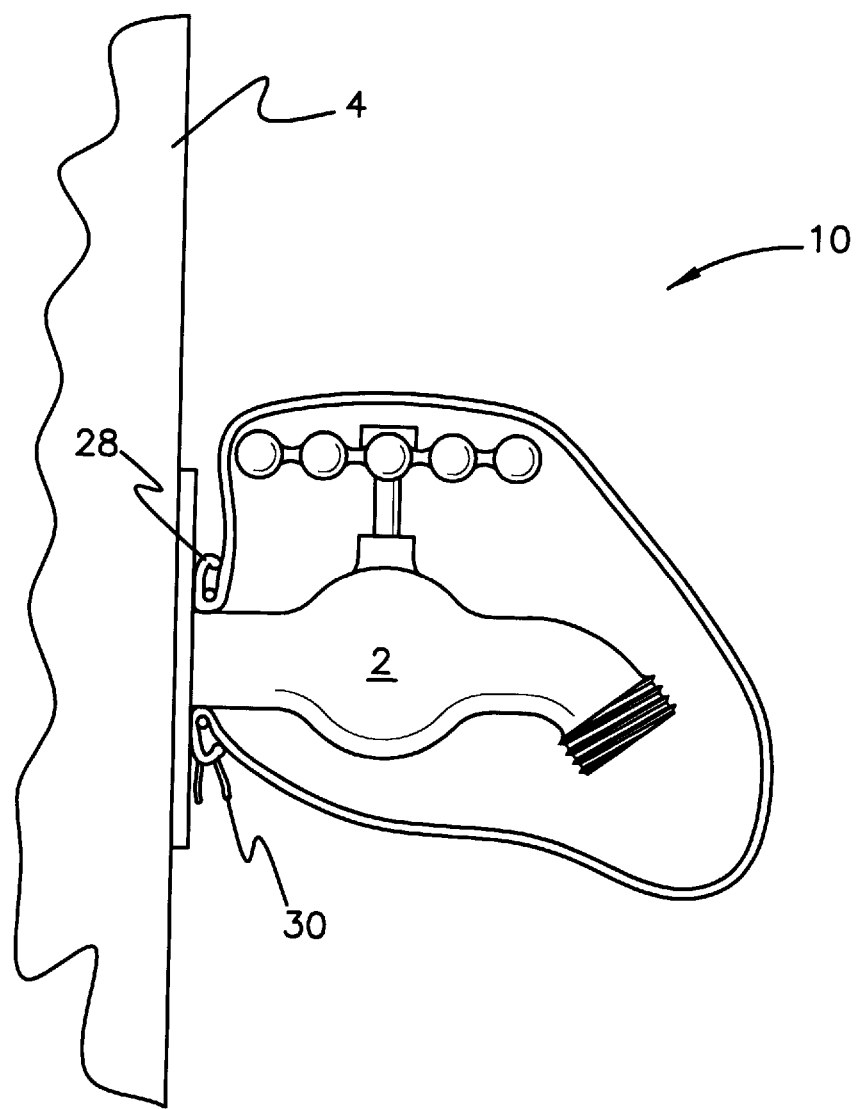
FIG. 1 is a diagrammatic, environmental, side elevational, cross sectional view of the invention, with rendering of individual parallel strata omitted for clarity.

Turning now to FIG. 1 of the drawings, insulating jacket 10 is shown covering and protecting a faucet 2 which projects to the outside of a building (not shown in its entirety) from wall 4. Insulating jacket 10 is flexible, so as to conform to the irregular configuration of faucet 2.

Figure 2:
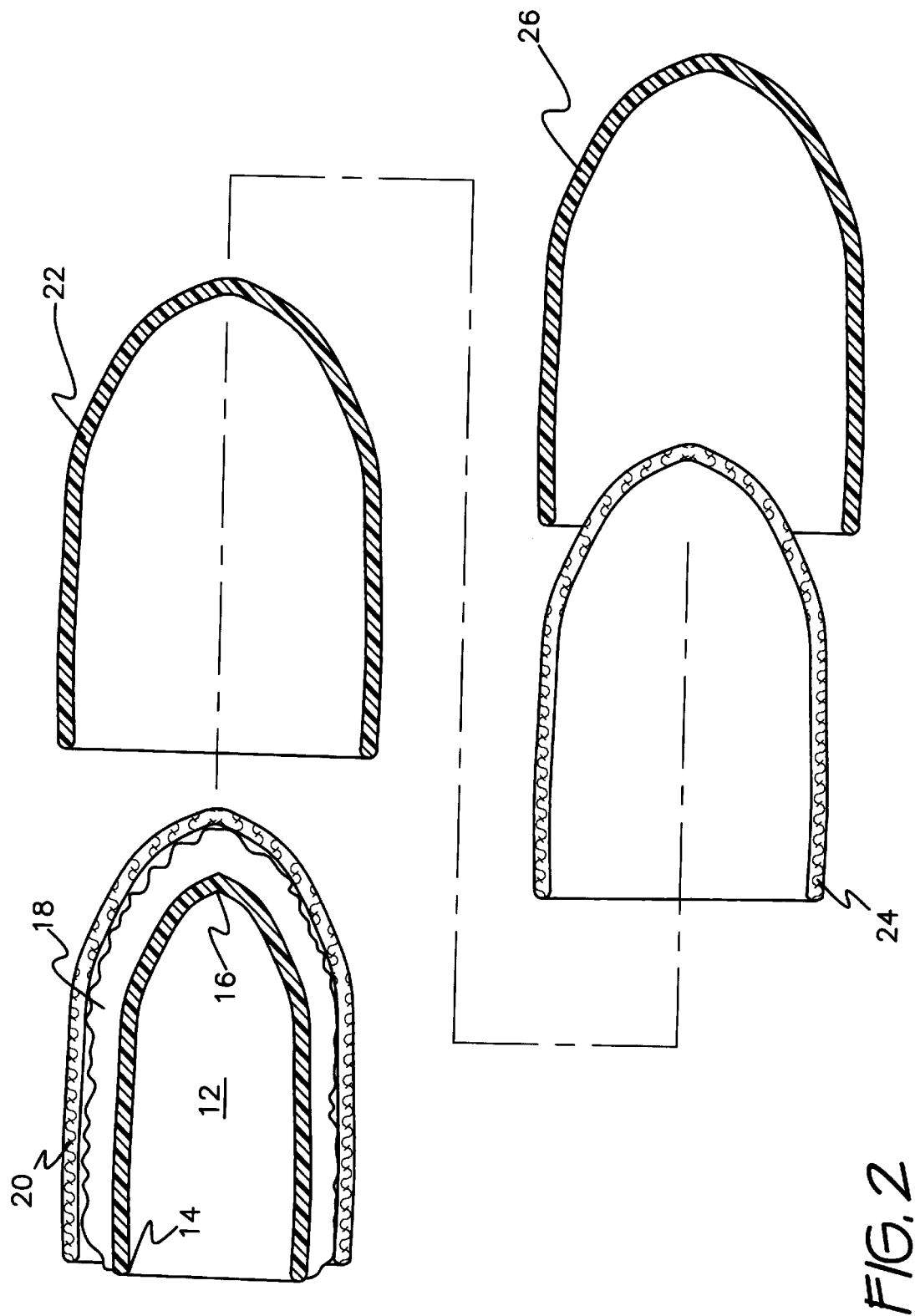
FIG. 2 is a partially exploded, side elevational, cross sectional view of the invention.

FIG. 2 shows construction of insulating jacket 10. A flexible, smooth inner cover 12 configured generally as a sleeve having an open proximal end 14 and a closed distal end 16 is the innermost one of several strata. Configuration of a sleeve signifies that the member so described forms an annulus intended to surround an enclosed object about the circumferential wall of the annulus, but which member slumps of its own accord and conforms to the enclosed object due to flexibility of the constituent material. One end of the sleeve is closed in the fabrication of the member, or by stitching, adhering, sonic or thermal welding, or by any other suitable method. The other end of the member is left open for passing the member over an object to be enclosed.

The exterior surface of inner cover 12 is coated with an adhesive, such as any commercially available spray adhesive, to which a stratum of loose insulating fill 18 is adhered. A fabric sock 20 is placed outside so as to surround inner cover 12 and fill 18. Fill 18 and sock 20 collectively form a first insulating member. Inner cover 12 both forms a solid surface for depositing loose fill 18 and also assures that fill 18 and sock 20 will not snag on or be subjected to abrading contact with the enclosed object.

An intermediate barrier 22 is placed over the first insulating member. A second insulating member in the form of a woolen sock 24 is placed over intermediate barrier 22, so that intermediate barrier member 22 is disposed between the first insulating member and the second insulating member. It is preferable although not critical that at least one insulating member be formed from wool material, since effectiveness of insulative qualities of that insulating member of insulating jacket 10 will be preserved even if water saturates insulating jacket 10. Finally, outer cover 26 is placed over the second insulating member, thereby also covering and surrounding intermediate barrier 22, the first insulating member, and inner cover 12.

Inner cover 12, the first and second insulating members, intermediate barrier 22, and outer cover 26 are all configured as sleeves having an open end and a closed end, as described with respect to inner cover 12. These components are assembled in generally concentric fashion, so as to form a single flexible member forming a sleeve which may be installed on faucet 2 or another object to be protected. The open ends of these components are all located proximate one another and oriented in the same direction, so that resultant insulating jacket 10 has an open end for passing over the object being protected.

Inner cover 12, intermediate barrier member 22, and outer cover 26 may comprise plastic bags. Plastic or synthetic resin material is sufficiently flexible for conforming to the object being covered, wind and water resistant, so that dry, dead air layers are created between adjacent members formed by plastic bags, which characteristic augments natural insulation qualities of fill 18 and socks 20 and 24, and also provides a smooth, reasonably strong surface preventing snagging and deleterious contact of the first insulating member with the object being protected. Intermediate barrier member 22 enables a certain degree of spontaneous adjustment of the first and second insulating members in that each can slide axially relative to the other without causing bunching of either. Intermediate barrier also provides a secondary defensive barrier to penetration of water from the exterior or even from the interior. Should faucet 2 develop a leak, accumulating water will to a certain extent be prevented from saturating the first and second insulating members by inner cover 12 and intermediate barrier 22.

Novel insulating jacket 10 may be placed over faucet 2 or another object in any orientation. In some localities, water spigots for serving lawns and gardens are ground mounted and project vertically. Jacket 10 may be placed over any of these arrangements of plumbing fixtures.

Returning to FIG. 1, insulating jacket 10 may be shortened by rolling the open end to form a cuff 28. Obviously, rolling may be performed to any desired degree, so that effective length of insulating jacket 10 may be varied to the user's preference. Insulating jacket 10 may be gathered or closed at cuff 28 by utilizing a draw cord 30. Draw cord 30 may be elastic or non-elastic. One or two incisions (not shown) are cut into outer cover 26 (see FIG. 2), and draw cord 30 is inserted through the incisions and passed around the circumference of cuff 30 inside outer cover 26. Exposed ends of draw cord 30 may be tightened and tied, thereby constricting or inwardly and radially gathering cuff 30, whereby the open end of insulating jacket 10 may be closed over faucet 2 or another object being covered and protected thereby.

Obviously, the present invention is subject to variations and modifications which may be introduced without departing from the inventive concept. For example, the order of the first and second insulating members may be reversed. Other materials may be employed to form the insulating members. An insulating member or component thereof may be adhered to the interior surface of inner cover 12, intermediate barrier 22, or outer cover 26, if desired. Alternatively, no component of an insulating member need be adhered.

It is to be understood that the present invention is not limited to the embodiments described above, but encompasses any and all embodiments within the scope of the following claims.

I claim:

1. An insulating jacket for covering and protecting an object projecting from an environmental surface, said insulating jacket comprising:

a flexible, smooth inner cover configured generally as a sleeve having an open proximal end and a closed distal end, said inner cover comprising a plastic bag;

a first insulating member configured generally as a sleeve having an open proximal end and a closed distal end, said first insulating member comprising a first stratum of flexible loose fill insulating material adhered to said inner cover and a fabric sock disposed outside and surrounding said inner cover in generally concentric fashion, said open proximal end of said inner cover disposed proximate said open proximal end of said first insulating member, whereby said first insulating member is protected against snagging and direct contact with an object being covered and protected by said insulating jacket;

a flexible second insulating member comprising a woolen sock, whereby effectiveness of insulative qualities of said insulating jacket are preserved even if water saturates said insulating jacket;

a flexible, smooth intermediate barrier member disposed between said first insulating member and said second insulating member, said first insulating member, said barrier member, and said second insulating member disposed generally concentrically with respect to one another, whereby said first insulating member can slide axially relative to said second insulating member while avoiding bunching of said first insulating member and said second insulating member; and an outer cover configured generally as a sleeve having an open proximal end and a closed distal-end, said outer cover disposed to surround said first insulating member in generally concentric fashion, said open proximal end of said first insulating member disposed proximate said open proximal end of said outer cover, whereby said insulating jacket has one open end, said outer cover comprising at least one stratum of flexible, water and wind resistant material disposed exteriorly of said stratum of insulating material.

2. The insulating jacket according to claim 10, said outer cover and said first insulating member rolled to form a cuff, said insulating jacket further comprising a draw cord disposed to constrict said cuff inwardly and radially, whereby said open end of said insulating jacket may be closed over an object being covered and protected by said insulating jacket.

* * * * *